(12) United States Patent
Morant

(10) Patent No.: US 11,828,455 B2
(45) Date of Patent: Nov. 28, 2023

(54) LIGHT SOURCE

(71) Applicant: BAE SYSTEMS plc, London (GB)

(72) Inventor: Paul Stewart Morant, Rochester (GB)

(73) Assignee: BAE SYSTEMS plc, London (GB)

( * ) Notice: Subject to any disclaimer, the term of this patent is extended or adjusted under 35 U.S.C. 154(b) by 0 days.

(21) Appl. No.: 17/756,827

(22) PCT Filed: Nov. 19, 2020

(86) PCT No.: PCT/GB2020/052949
§ 371 (c)(1),
(2) Date: Jun. 3, 2022

(87) PCT Pub. No.: WO2021/111103
PCT Pub. Date: Jun. 10, 2021

(65) Prior Publication Data
US 2023/0024251 A1    Jan. 26, 2023

(30) Foreign Application Priority Data

Dec. 6, 2019 (EP) ..................................... 19275144
Dec. 6, 2019 (GB) ................................... 1917889.6

(51) Int. Cl.
*F21V 7/04* (2006.01)
*F21V 7/00* (2006.01)
(Continued)

(52) U.S. Cl.
CPC ............ *F21V 7/041* (2013.01); *F21V 7/0066* (2013.01); *F21V 7/0091* (2013.01);
(Continued)

(58) Field of Classification Search
None
See application file for complete search history.

(56) References Cited

U.S. PATENT DOCUMENTS 4,897,771 A * 1/1990 Parker .................. G02B 6/4298
362/349
2002/0027779 A1    3/2002 Cassarly et al.
(Continued)

FOREIGN PATENT DOCUMENTS

EP    1321902 A1    6/2003
JP    2011039395 A    2/2011
(Continued)

OTHER PUBLICATIONS

International Search Report and Written Opinion received for PCT Application No. PCT/GB2020/052949, dated Dec. 23, 2020. 13 pages.
(Continued)

*Primary Examiner* — Alan B Cariaso
(74) *Attorney, Agent, or Firm* — Finch & Maloney PLLC

(57) ABSTRACT

A dynamic light source for a display is disclosed. The dynamic light source comprises a first light source located inside a first device; and a second light source. The first device is configured to allow light from the first light source to exit the first device in a first cone of angles and to reflect light incident outside the cone of angles back towards the first light source. The first device is configured such that injected light from the second light source is reflected by the first light source in a second cone of angles substantially coincident with the first cone of angles and that light output by the first device from the second light source is attenuated more than light output by the first light source, and an amount of attenuation is based on an intended dynamic power range of the dynamic light source.

19 Claims, 1 Drawing Sheet

(51) Int. Cl.
*G02B 19/00* (2006.01)
*F21Y 115/10* (2016.01)

(52) U.S. Cl.
CPC ..... *G02B 19/0019* (2013.01); *G02B 19/0061* (2013.01); *F21Y 2115/10* (2016.08)

(56) References Cited

U.S. PATENT DOCUMENTS

| | | |
|---|---|---|
| 2004/0232812 A1 | 11/2004 | Beeson et al. |
| 2004/0233664 A1 | 11/2004 | Beeson et al. |
| 2005/0161586 A1 | 7/2005 | Rains, Jr., et al. |
| 2005/0219476 A1 | 10/2005 | Beeson et al. |
| 2007/0206164 A1 | 9/2007 | Beeson et al. |
| 2010/0277925 A1* | 11/2010 | Tan .................. F21K 9/68 362/346 |
| 2011/0199753 A1* | 8/2011 | Ramer .................. F21K 9/62 313/503 |
| 2011/0242836 A1* | 10/2011 | Li .................. G03B 21/208 362/555 |
| 2013/0021793 A1 | 1/2013 | Zimmerman et al. |
| 2017/0045740 A1 | 2/2017 | Hirata et al. |
| 2018/0059482 A1 | 3/2018 | Li et al. |
| 2018/0364464 A1* | 12/2018 | Senn .................. G02B 19/0019 |

FOREIGN PATENT DOCUMENTS

| | | |
|---|---|---|
| WO | 2007040540 A1 | 4/2007 |
| WO | 2018185475 A1 | 10/2018 |
| WO | 2021111103 A1 | 6/2021 |

OTHER PUBLICATIONS

Extended European Search Report received for EP Application No. 19275144.4, dated May 12, 2020. 9 pages.
Combined Search and Examination Report under Sections 17 and 18(3) received for GB Application No. 2018163.2, dated May 12, 2021. 8 pages.
GB Search Report under Section 17(5) received for GB Application No. 1917889.6, dated Aug. 26, 2020. 3 pages.
International Preliminary Report on Patentability received for PCT/GB2020/052949, dated Jun. 16, 2022. 8 pages.

* cited by examiner

LIGHT SOURCE

BACKGROUND

For some applications it is desirable to have a light source that has a high range of output intensities, for example a light source for a head up display (HUD) or head mounted display (HMD).

DETAILED DESCRIPTION

Figure 1A:
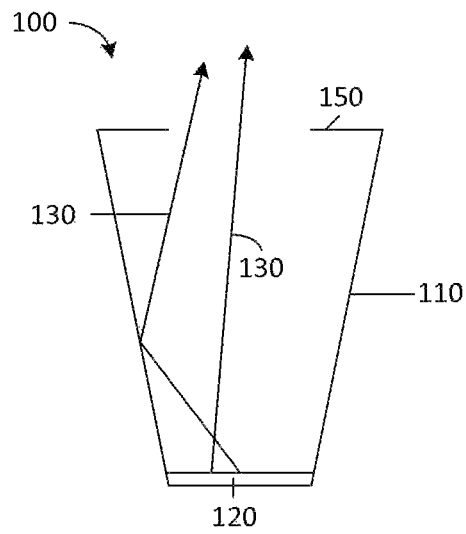
FIGS. 1A and 1B illustrate a conventional light source.
Figure 1B:
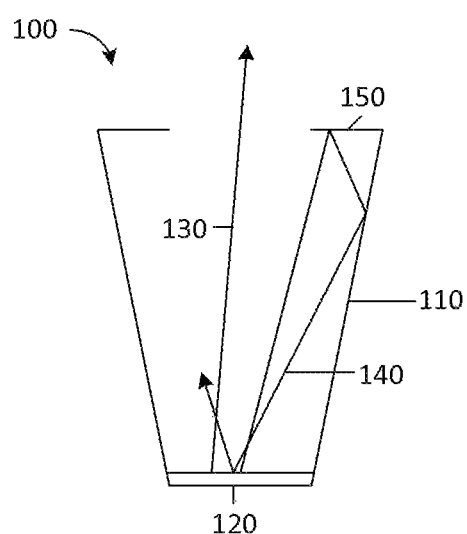

FIG. 1A illustrates a conventional light source 100. Conventional light source 100 comprises a light source 120 located inside a light pipe 110 comprising a reflective aperture 150. Light pipe 110 and light source 120 are configured to allow output light 130 to exit light pipe 110 in a cone of angles, and to prevent light exiting the light pipe outside of the cone of angles. The light may be prevented from exiting outside of the cone of angles by the presence of the reflective aperture 150. This is described with relation to FIG. 1B.

The reflective aperture 150 reflects incident light 140 that is incident onto aperture 140 such that the light is reflected back towards the light source 120, increasing the amount of useful power output from the conventional light source 100 by providing light recycling. This may a direct reflection from the reflective aperture 150 or indirect, via the sides of the light pipe 110.

However, some applications use very high dynamic ranges of optical power and therefore high current ranges are required. In some examples a range of micro Amps to ~1 Amp (a dynamic range of approximately $1:10^6$). This may require very complicated and large electronics. Typically an LED has an approximately linear relationship between output power and drive current. Therefore, to obtain a dynamic power range of approximately $1:10^6$ of power, a drive current range of approximately $1:10^6$ is also needed. This may be particularly problematic when the conventional light source 100 is used on a HMD, as this could make the helmet bulky and heavy.

Figure 2:
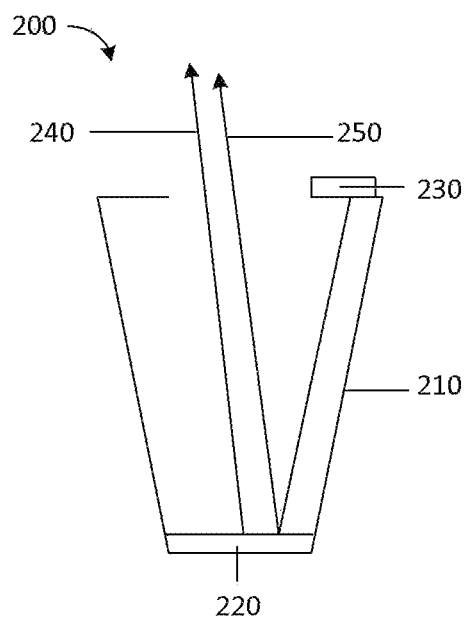
FIG. 2 illustrates a light source in accordance with some examples.

FIG. 2 illustrates a dynamic light source 200 in accordance with some examples. Dynamic light source 200 comprises a first device 210, a first light source 220 and a second light source 230. The first light source 220 is located inside first device 210 and the first device 210 is configured to allow light from the first light source 220 to exit the first device 210 in a first cone of angles 240. The first device 210 is further configured to reflect light incident outside the first cone of angles 240 back towards the first light source 220, similar to the conventional light source 100 described in relation to FIG. 1. Dynamic in this context refers to the fact that the optical power of the dynamic light source 200 may be varied.

Second light source 230 emits light towards the first light source 220, which is then reflected in a second cone of angles 250 substantially coincident with the first cone of angles. At least due to the fact that light emitted from the second light source 230 is reflected from the first light source 220, the output power of the second cone of angles 250 is attenuated more compared to the output power directly from the first light source 220. This may allow the dynamic light source 200 to have a dynamic range of power or luminance that is greater than for the same current range than the dynamic range that would be allowed if the second light source 230 was not used. This is because the second light source 230 may be used to obtain the low power outputs that would conventionally require the first light source 220 to be driven with small electrical currents.

Light output by the dynamic light source 200 from second light source 230 may be attenuated more than light output from the first light source 220 by taking advantage of attenuation in the second light source, insertion/output losses, and loss when light is reflected at the first light source. This is counter-intuitive, as normally the losses would be carefully limited. The amount of attenuation is based on the intended dynamic power or luminance range of the dynamic light source 200. This may allow substantially similar light sources to be used, with substantially similar drive current demands, but still able obtain a higher dynamic range than would be possible with a single conventional LED.

In some examples the first light source 220 and the second light source 230 may be driven with substantially the same range of input currents, but may result in a different range of output powers from the light source 100. In some examples the output powers may differ by approximately an order of magnitude. In some examples the first light source 220 may be used to output light from the light source 200 with a drive current in the range of ~0.01 A to ~1 A and the second light source may output light from the light source 200 as if the first light source was driven with a current the range of ~1 micro A to ~0.01 A.

In some examples the attenuation may be based on the square root of the desired optical power range of the dynamic light source 200. For example, if desired dynamic range of optical power is $1:10^6$ then the attenuation factor may be greater than approximately the square root of $10^6$, i.e.

1000 (or −30 dB). In some examples the attenuation may be greater than approximately 100 (−20 db). In some examples the attenuation factor may be greater than approximately 10 (−10 dB).

In some examples the first device 210 comprises a homogenising light pipe. In some examples the first device 210 comprises a tapered light pipe.

In some examples the first device 210 comprises an aperture to allow light to be output in the cone of angles. In some examples the second light source 230 is located substantially adjacent to the aperture.

In some examples the first light source 220 comprises at least one light emitting diode (LED). In some examples the first light source comprises a plurality of LEDs mounted on a die.

Figure 3:
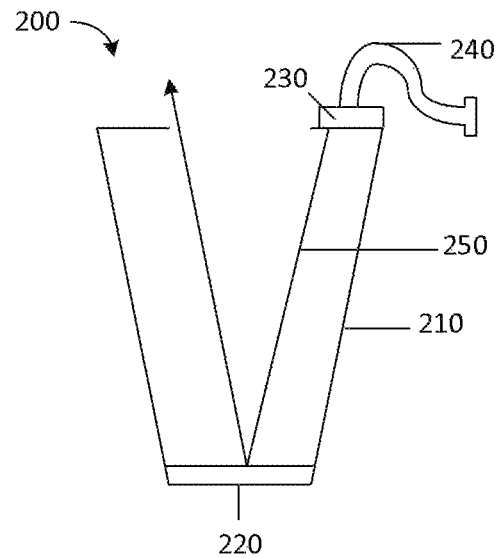
FIG. 3 illustrates a light source comprising a fibre optic cable in accordance with some examples.

FIG. 3 illustrates the dynamic light source 200 according to some examples, substantially similar to the description of FIG. 2, however the second light source 230 comprises a fibre optic cable 240. The fibre optic cable 240 may be used to couple the light from an external light source into the first device 210. This may allow a conventional light source 100, similar to that described with relation to FIG. 1 to be adapted to have the same output power range with a smaller electrical current range without needing to add a second LED to the light source 100. The use of the fibre optic cable may also allow a smaller and simpler device.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', can', 'first', 'second', etc. do not preclude a plurality. In the claims, the term 'comprising' or "including" does not exclude the presence of other elements.

The invention claimed is:

1. A dynamic light source for a display, the dynamic light source comprising:
    a first light source located inside a device; and
    a second light source;
    wherein the device is configured to allow light from the first light source to exit the device in a first cone of angles and to reflect light incident outside the cone of angles back towards the first light source; and
    wherein the device is configured such that injected light from the second light source is reflected by the first light source in a second cone of angles substantially coincident with the first cone of angles and that light output by the device from the second light source is attenuated more than light output by the first light source, and an amount of attenuation is based on an intended dynamic power range of the dynamic light source, wherein the attenuation is greater than a factor of 10.

2. The dynamic light source according to claim 1, wherein the attenuation is greater than a factor of 100.

3. The dynamic light source according to claim 1, wherein the attenuation is greater than a factor of 1000.

4. The dynamic light source according to claim 1, wherein the attenuation is substantially equal to a square root of the intended dynamic power range of the dynamic light source.

5. The dynamic light source according to claim 1, wherein the device comprises a homogenising light pipe.

6. The dynamic light source according to claim 1, wherein the device comprises a tapered light pipe.

7. The dynamic light source according to claim 1, wherein the device comprises an aperture to allow light to be output in the first cone of angles.

8. The dynamic light source according to claim 7, wherein the second light source is located substantially adjacent to the aperture.

9. The dynamic light source according to claim 1, wherein the second light source comprises a fibre optic cable.

10. The dynamic light source according to claim 9, wherein the fibre optic cable is coupled to an external light source.

11. The dynamic light source according to claim 1, wherein the first light source comprises at least one light emitting diode.

12. The dynamic light source according to claim 1, wherein the first light source comprises a die comprising a plurality of light emitting diodes.

13. The dynamic light source according to claim 1, wherein the first light source and second light source operate using substantially the same range of drive currents.

14. The dynamic light source according to claim 1, wherein the device comprises an aperture to allow light to be output in the second cone of angles.

15. The dynamic light source according to claim 1, wherein the device comprises an aperture to allow light to be output in the first and second cone of angles.

16. A dynamic light source for a display, the light source comprising:
    a device having an aperture;
    a first light source located inside the device; and
    a second light source;
    wherein the device is configured to allow light from the first light source to exit the device via the aperture in a first cone of angles and to reflect light incident outside the cone of angles back towards the first light source; and
    wherein the device is configured such that injected light from the second light source is reflected out of the aperture by the first light source in a second cone of angles substantially coincident with the first cone of angles and that light output by the device from the second light source is attenuated more than light output by the first light source, and an amount of attenuation is based on an intended dynamic power range of the dynamic light source, wherein the attenuation is greater than a factor of 10.

17. The dynamic light source according to claim 16, wherein the device comprises a light pipe, and the second light source comprises a fibre optic cable having an end that is located substantially adjacent to the aperture.

18. A dynamic light source for a display, the light source comprising:
    a light pipe having an aperture;
    a first light source located inside the light pipe; and
    a second light source;
    wherein the light pipe is configured to allow light from the first light source to exit the light pipe via the aperture in a first cone of angles and to reflect light incident outside the cone of angles back towards the first light source; and
    wherein the light pipe is configured such that injected light from the second light source is reflected out of the aperture by the first light source in a second cone of angles substantially coincident with the first cone of angles and that light output by the light pipe from the second light source is attenuated more than light output by the first light source, and an amount of attenuation is based on an intended dynamic power range of the dynamic light source, wherein the attenuation is greater than a factor of 10.

19. The dynamic light source according to claim 18, wherein the first light source comprises a die including a plurality of light emitting diodes.

* * * * *